Aug. 13, 1929.　　　E. P. DU PONT　　　1,724,464
CONVERTIBLE BODY FOR AUTOMOBILES
Filed April 11, 1927　　2 Sheets-Sheet 1

WITNESS:

INVENTOR
Eleuthere Paul du Pont
BY
ATTORNEYS

Aug. 13, 1929.  E. P. DU PONT  1,724,464
CONVERTIBLE BODY FOR AUTOMOBILES
Filed April 11, 1927   2 Sheets-Sheet 2

INVENTOR
Eleuthere Paul du Pont
BY
Busser + Harding
ATTORNEYS.

WITNESS:
Rob. R. Ketchel

Patented Aug. 13, 1929.

1,724,464

UNITED STATES PATENT OFFICE.

ELEUTHERE PAUL du PONT, OF MONTCHANIN, DELAWARE.

CONVERTIBLE BODY FOR AUTOMOBILES.

Application filed April 11, 1927. Serial No. 182,583.

My invention relates to convertible automobile bodies and more particularly to a body so constructed as to be converted from an open to a closed car type and vice versa.

Heretofore it has been known to provide convertible bodies for automobiles, but such have been open to numerous objections chief among which are that such bodies are so constructed that they are either not fully convertible, or where full convertibility is accomplished, the structure is such as to render conversion difficult and the body has an undesirable clumsy appearance.

Now it is the object of my invention to provide a body so constructed as to be readily converted from open to closed and vice versa and which at the same time will present a neat and finished appearance when either open or closed. Further objects of my invention are to provide a body of the type indicated, which will be of a simple and durable construction and relatively inexpensive to produce.

Having now indicated, in a general way, the nature and purpose of my invention, I will proceed to a detailed description thereof with reference to the accompanying drawings in which there is illustrated a preferred embodiment and in which:—

Figure 1:
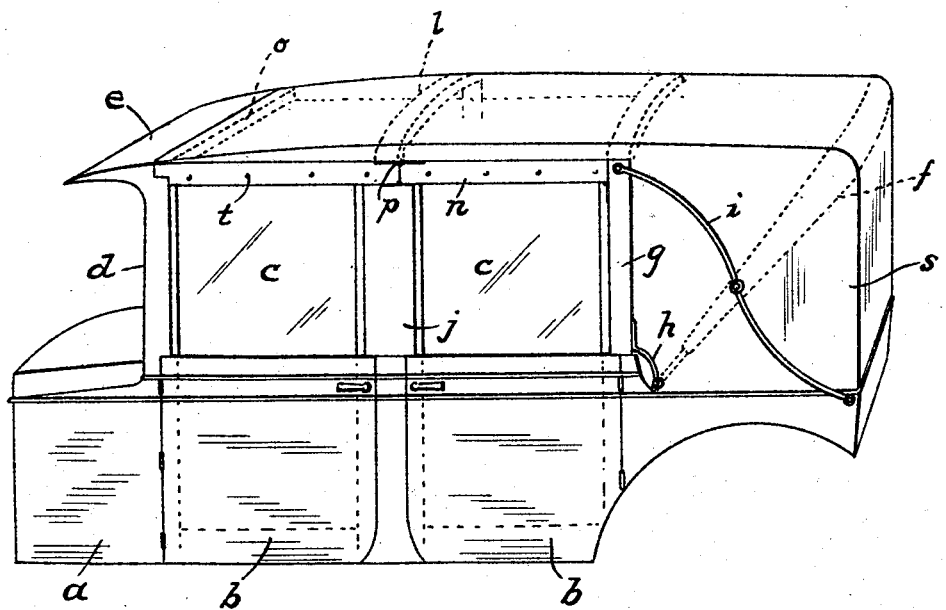
Fig. 1 is a perspective view of an automobile body embodying my invention in closed position.
Figure 2:
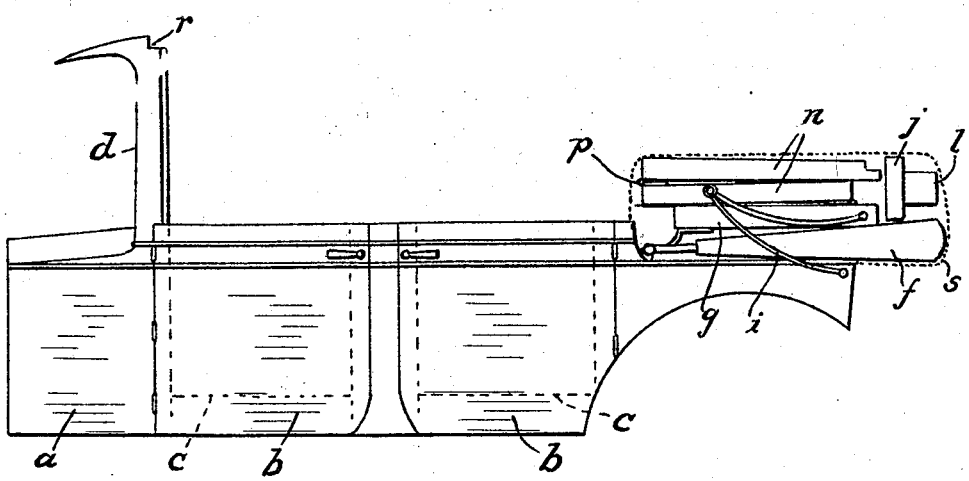
Fig. 2 is a side view of the body shown in Fig. 1 in open position.

In the drawings, $a$ indicates a body provided with the usual front and back seats and adapted to be supported on the frame of an automobile. The body $a$ is provided on opposite sides with front and rear doors $b$, within which are adapted to slide windows $c$, and with a wind shield support $d$ provided with a visor $e$.

Figure 3:
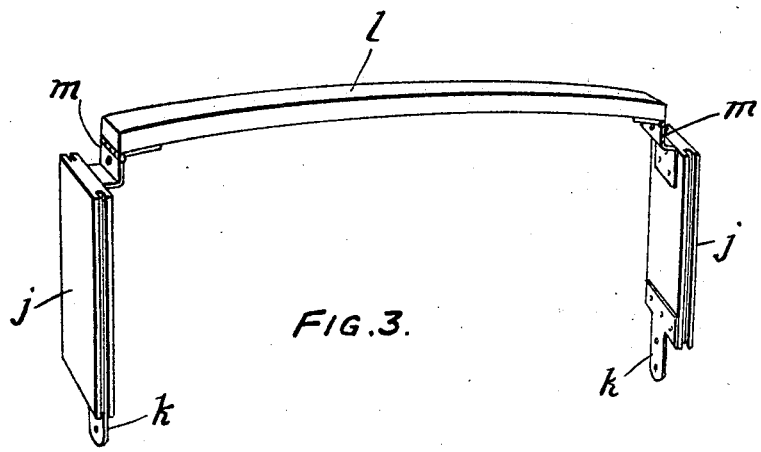
Figs. 3, 4, 5 and 6 are views showing details of construction.

Pivoted at opposite sides of the body adjacent the rear thereof is a rear top bow $f$. A second top bow $g$ is pivotally connected to the pivots supporting the bow $f$ through the medium of brackets $h$ and is adapted to be supported in raised position by means of a collapsible bracket $i$ pivotally secured to the bow and body. A third top bow is formed by means of a pair of upright members or posts $j$ secured to the body on opposite sides between the doors $b$, by any conveniently removable means as a thumb screw, through the medium of brackets $k$. A cross member $l$ is connected to the posts $j$ by means of hinges $m$, one arm of each of which is so formed as to space the ends of the cross member above and laterally of the upper ends of the posts, as shown in Fig. 3.

Figure 5:
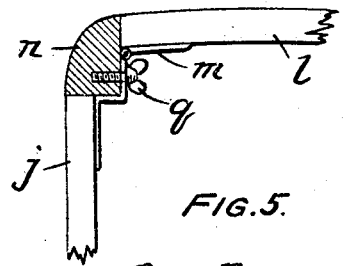
Figure 6:
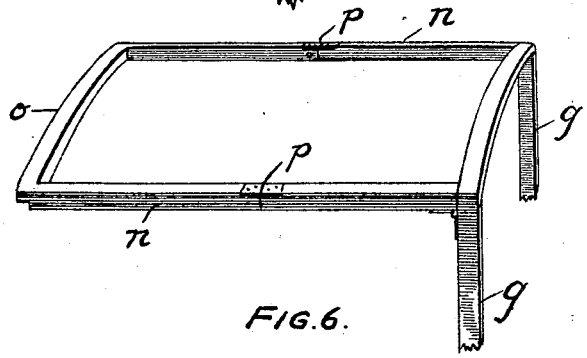

Hinged to the bow $g$ and extending forwardly are a pair of side members $n$, connected at their forward ends by a cross member $o$ and intermediately hinged as at $p$. The side members $n$ are so formed as to rest on the upper ends of the posts $j$ and to fill in the space between the upper ends of the posts $j$ and the ends of the cross member $l$ connected thereto by means of hinges $m$. The side members $n$ are adapted to be secured to an arm of the hinges $m$ by means of thumb screws $q$, as shown in Fig. 5. The cross member $o$ is adapted to rest in a recess $r$ formed in the wind shield support $d$ and to be secured thereto by any convenient means.

The top covering $s$, which may be of any desired material, is permanently secured at the rear of the body and is adapted to be secured by means of removable fasteners $t$ to the upright portions of the bow $g$ and to the side members $n$.

The rear edges of the wind shield support, the edges of the posts $j$ and the front edges of the bow $g$ are positioned and grooved in line with the window frames in the doors so that the windows $c$ may be readily slid up to complete closure of the body, the tops for the windows being formed by the lower faces of side members $n$.

Figure 4:
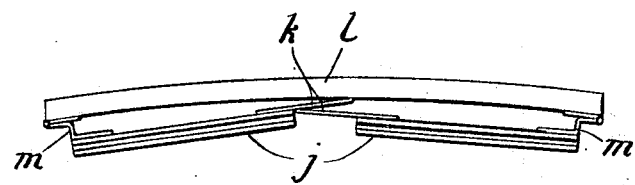

In operation assuming that the body is closed as illustrated in Fig. 1, and it is desired to convert it to an open body, the top covering is unfastened and laid back and the windows lowered into the doors. The posts $j$ are then released from the side members $n$ by removal of thumb screws $q$ and removed and folded in against cross member $l$, as shown in Fig. 4. The side members $n$ are folded upon themselves at the hinges $p$ and folded down against the bow $g$ on their hinge connections therewith. The bows $g$ and $f$ are then folded down, the braces $i$ being collapsed. The posts $j$ and cross member $l$ are laid on the bow $f$ and the top covering is brought over and secured to form a boot for the lowered top.

When it is desired to convert the car into a closed type such is readily accomplished by raising bows *f* and *g*, extending side members *f*, placing posts *j* and cross member *l* in position and finally securing the top covering in place and raising the windows *c* to a desired extent.

It will now be noted that by virture of my invention, I have provided a convertible body of simple construction which may be easily opened and closed and which will be finished in appearance in both open and closed position.

Having now fully described my invention, what I claim and desire to protect by Letters Patent is:—

1. The combination with an automobile body provided with a pair of doors on opposite sides and windows slidable within the doors, a pivotally mounted top bow, side members hinged to and extending forwardly from said bow and a bow comprising vertical members and a cross piece, the ends of which are spaced from ends of the vertical members, hinged brackets connecting the spaced ends of said cross piece and vertical members, said last mentioned bow being adapted to be connected to the body between the doors and adapted to receive said side members between the spaced ends of the cross members and said vertical members, and means for securing said side members to said hinged brackets.

2. The combination with an automobile body, of a pivotally mounted top bow, side members secured to the top bow and extending forwardly therefrom, a second bow comprising vertical members adapted to be detachably secured to the body forwardly of the top bow and a cross piece hinged to the vertical members, the ends of the cross piece being spaced from the ends of the vertical members for the reception of the side members, and means for detachably securing the side members to said second bow.

In testimony of which invention, I have hereunto set my hand at Montchanin, Delaware, on this fourth day of April, 1927.

ELEUTHERE PAUL du PONT.